US012673507B2

(12) United States Patent
Landau et al.

(10) Patent No.: US 12,673,507 B2
(45) Date of Patent: *Jul. 7, 2026

(54) FABRIC PRINTING ON NESTED PATTERNS, AND ASSOCIATED PRINT SYSTEMS AND PRODUCTS THEREOF

(71) Applicant: FIERY, LLC, Fremont, CA (US)

(72) Inventors: Asaf Landau, Rosh Ha'Ayin (IL); Ron Grinfeld, Givatayim (IL); Ghilad Dziesietnik, Palo Alto, CA (US)

(73) Assignee: FIERY, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/950,626

(22) Filed: Nov. 18, 2024

(65) Prior Publication Data

US 2025/0074074 A1 Mar. 6, 2025

Related U.S. Application Data

(63) Continuation of application No. 18/352,979, filed on Jul. 14, 2023, now Pat. No. 12,179,503, which is a continuation of application No. 16/151,110, filed on Oct. 3, 2018, now Pat. No. 11,712,904.

(60) Provisional application No. 62/568,245, filed on Oct. 4, 2017.

(51) Int. Cl.

| | |
|---|---|
| ***B41J 3/407*** | (2006.01) |
| ***A41H 3/08*** | (2006.01) |
| ***B41F 33/16*** | (2006.01) |
| ***B41J 11/66*** | (2006.01) |
| ***D06P 5/30*** | (2006.01) |
| ***D06Q 1/00*** | (2006.01) |

(52) U.S. Cl.

CPC .............. *B41J 3/4078* (2013.01); *A41H 3/08* (2013.01); *B41F 33/16* (2013.01); *B41J 11/663* (2013.01); *D06P 5/30* (2013.01); *D06Q 1/00* (2013.01)

(58) Field of Classification Search

CPC ......... B41J 3/4078; B41J 11/663; A41H 3/08; B41F 33/16; D06P 5/30; D06Q 1/00

See application file for complete search history.

(56) References Cited

U.S. PATENT DOCUMENTS

| | | | | |
|---|---|---|---|---|
| 5,172,326 | A | 12/1992 | Campbell et al. | |
| 6,173,211 | B1 | 1/2001 | Williams et al. | |
| 9,623,578 | B1 * | 4/2017 | Aminpour .............. | B26D 5/007 |
| 11,712,904 | B2 | 8/2023 | Landau et al. | |
| 12,179,503 | B2 * | 12/2024 | Landau ..................... | D06P 5/30 |

(Continued)

FOREIGN PATENT DOCUMENTS

| | | | |
|---|---|---|---|
| EP | 0950752 | A1 | 10/1999 |
| WO | 2015153764 | A1 | 10/2015 |

(Continued)

*Primary Examiner* — David H Banh

(74) *Attorney, Agent, or Firm* — PERKINS COIE LLP

(57) ABSTRACT

Disclosed are methods that couple effective nesting of fabric, as part of a textile cutting process, in which designs and/or graphic elements are directly printed on the nested elements, instead of on the entire textile sheet. Embodiments of the invention can address issues of waste and redundant printing, such as by starting with a blank textile roll, and printing only in the geometry areas of the patterns. Embodiments of the invention can increase fabric yield, because there are no constraints between the pattern geometries and the textile sheet print.

20 Claims, 11 Drawing Sheets

(56) References Cited

U.S. PATENT DOCUMENTS

| | | | | |
|---|---|---|---|---|
| 2001/0045148 | A1 | 11/2001 | Gerent et al. | |
| 2001/0052312 | A1* | 12/2001 | Codos | B41J 2/01 112/475.08 |
| 2004/0255807 | A1 | 12/2004 | Xiong | |
| 2011/0235105 | A1* | 9/2011 | Ozawa | G06K 15/02 358/1.15 |
| 2012/0024177 | A1 | 2/2012 | Warner et al. | |
| 2014/0277663 | A1 | 9/2014 | Gupta et al. | |
| 2015/0042675 | A1 | 2/2015 | Burke | |
| 2016/0060807 | A1 | 3/2016 | Tharpe et al. | |
| 2016/0347085 | A1 | 12/2016 | Cloots et al. | |
| 2017/0112216 | A1 | 4/2017 | Teveris | |
| 2022/0413466 | A1* | 12/2022 | Ingling | D06P 7/00 |

FOREIGN PATENT DOCUMENTS

| | | | |
|---|---|---|---|
| WO | 2017142718 | A1 | 8/2017 |
| WO | 2020068968 | A1 | 4/2020 |

* cited by examiner

FABRIC PRINTING ON NESTED PATTERNS, AND ASSOCIATED PRINT SYSTEMS AND PRODUCTS THEREOF

CROSS-REFERENCE TO RELATED APPLICATIONS

This Application is a continuation of U.S. application Ser. No. 18/352,979 filed Jul. 14, 2023, which is a continuation of U.S. application Ser. No. 16/151,110, filed 3 Oct. 2018, which claims priority to U.S. Provisional Application No. 62/568,245, filed 4 Oct. 2017, each of which are incorporated herein in their entirety by this reference thereto.

FIELD OF THE INVENTION

At least one embodiment of the present invention pertains to printing. More specifically, at least one embodiment of the present invention pertains to fabric printing on nested patterns.

BACKGROUND

In conventional fabric printing and garment design and production, garment patterns are applied to printed fabrics, for instance, at the present time, a typical workflow for fabric printing and the use of nested patterns can include the following tasks or process steps:

Fabric Creation

A design pattern is defined using graphic design tools, such as Adobe Photoshop or Adobe Illustrator. The fabric is printed to the defined design, either using an analog printer, e.g. a rotary or flat-screen printer, or digitally, such as using a combination of a digital front end (DFE) and raster image processing (RIP), and a corresponding digital inkjet press. Most of the time, the design pattern is expressed by stepping and repeating on the fabric with a basic building block. The fabric can be produced with different "color ways" for the same graphic designs. For instance, a garment design may often be produced with two or three color ways, e.g., in blue tones or earth tones.

Garment Creation

The design of the garment can often be created using graphic design tools, such as Adobe Photoshop or Adobe Illustrator. The design can then be converted to a corresponding technical design, using 2D/3D CAD systems such as EFI-Optitex. The output of this process is a set of cut and sew patterns, with the selected fabric position and rotation assigned properly to the cut patterns.

Nesting

The set of cut and sew patterns are then aligned properly to the pre-fabricated fabric, taking into account positioning on the fabric, after which the cut patterns are sent to the cut and sew manufacturing facility, for the final assembly of the garment. The process of aligning the cut pattern to the proper place in the fabric graphic patterns creates waste in fabric utilization.

In such a conventional process, textile sheets and rolls are pre-printed with designs and graphics, and are subsequently placed on cutting tables, to be used for nesting and cutting design patterns, which are later sewed into a final textiles consumable, e.g., garments, bedding, etc.

In the conventional process described above, there is often substantial waste in the printing of fabrics, because there is no prior knowledge of what the specific fabric elements geometries are, and how they match the prints.

Also, such conventional methods mandate specific nesting of the fabric pattern elements to the textile texture print to match the required print design, which can result in poor cutting yields, due to a high level of constraints between the pattern geometries and the textile sheet print.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is are technique that allows effective nesting of fabric, as part of a textile cutting process, in which designs and/or graphic elements are directly printed on the nested elements, instead of on the entire textile sheet.

Certain embodiments of the invention can address issues of waste and redundant printing, such as by starting with a blank textile roll, and printing only in the geometry areas of the patterns.

Certain embodiments of the invention can increase fabric yield, because there are no constraints between the pattern geometries and the textile sheet print.

Various exemplary embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Fabric Printing on Nested Patterns

Embodiments of the invention concern a method that couples effective nesting of fabric as part of the textile cutting process with direct printing designs on the nested elements instead of the entire textile sheet.

Embodiments of the invention address both the waste in redundant printing because it uses a blank textile role to start with and prints only in the patterns geometry areas. Embodiments of the invention also increase fabric yield because there are no constraints between the pattern geometries and the textile sheet print.

Figure 1:
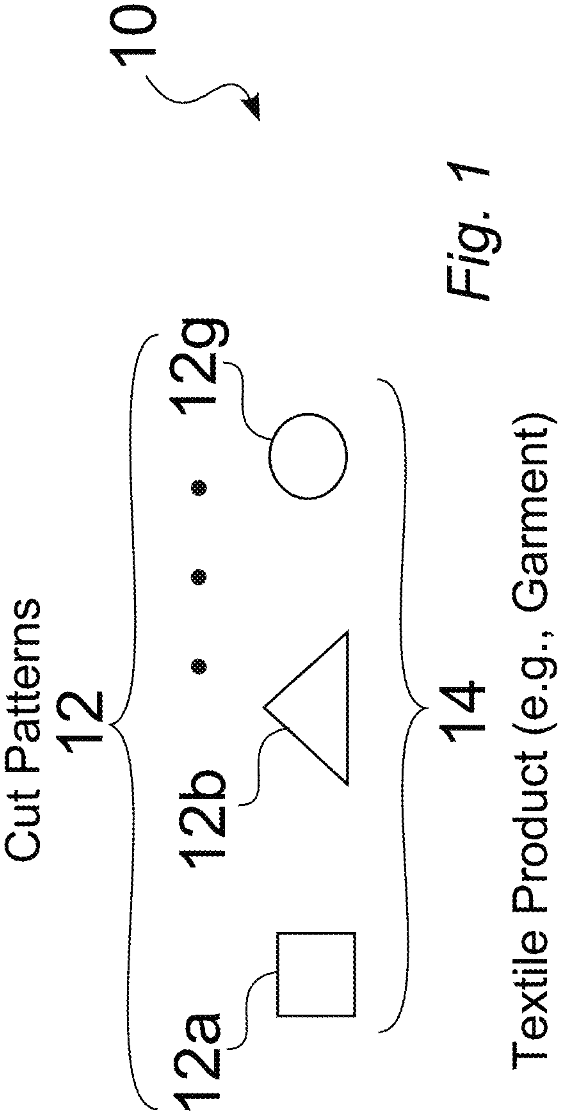
FIG. 1 is a simplified schematic diagram of different cut patterns for a textile product, such as a garment.

FIG. 1 is a simplified schematic diagram 10 of different cut patterns 12 for a textile product 14, such as a garment 14. For instance, the cut patterns 12 for a garment 14 to be sewn from fabric 302 (FIG. 8) can include a plurality of different cut patterns 12*a*-12*g*, which for a shirt or blouse 14 may typically include one or more back patterns and one or more front patterns, as well as sleeves, and may further include other patterns, e.g., a collar, pockets, cuffs and/or trim. In FIG. 1, the different patterns 12 are schematically depicted as including a square or rectangular pattern 12*a*, a triangular pattern 12*b*, and a circular or oval pattern 12*g*.

Figure 2:
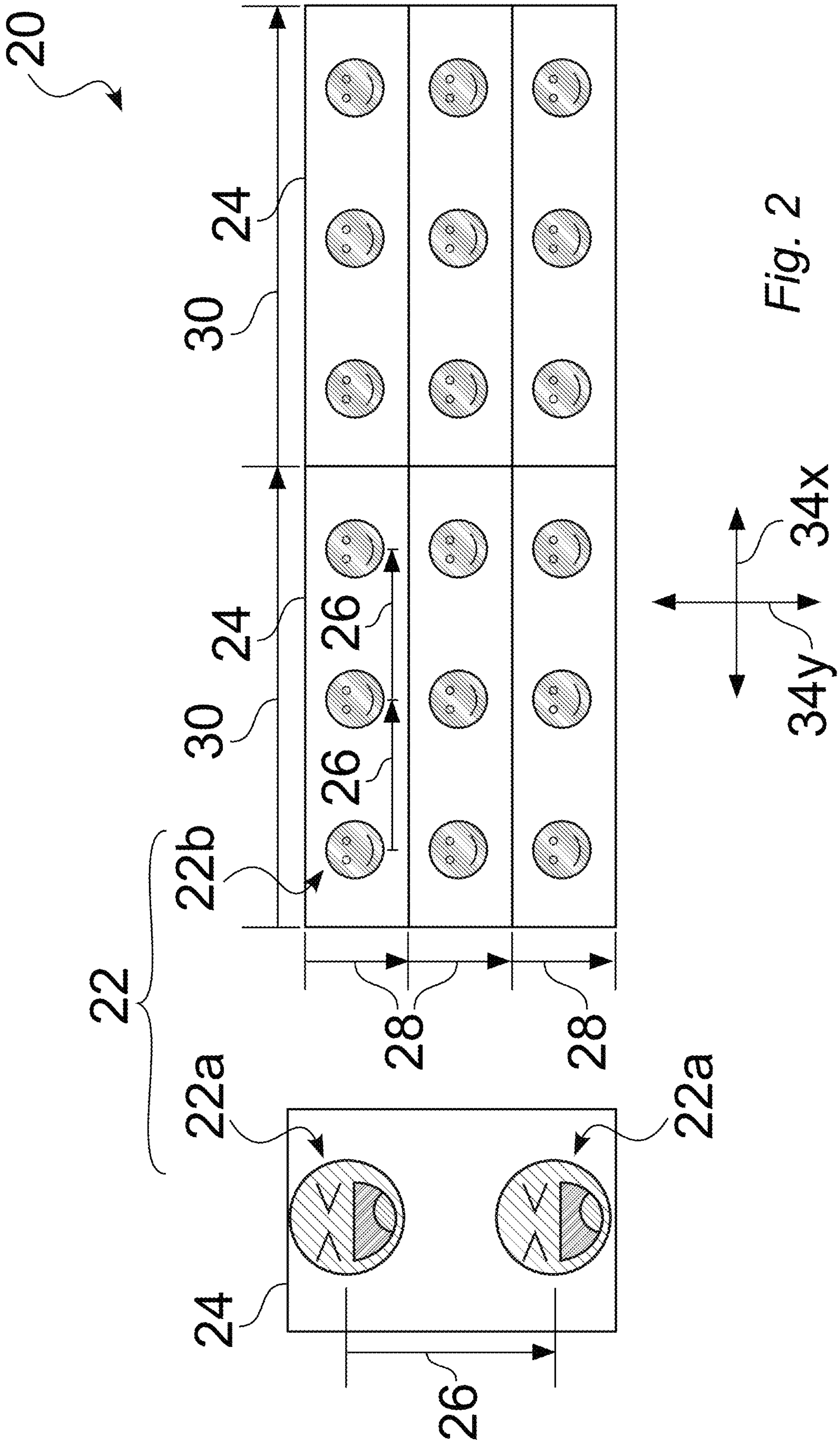
FIG. 2 shows illustrative graphic design elements that can be applied to a fabric design layout, in which one or more graphic design elements can be stepped and repeated.

FIG. 2 shows is a simplified schematic view 20 showing illustrative graphic design elements 22, e.g., 22*a*, 22*b*, which can be applied to a fabric design layout, in which one or more graphic design elements 22 can be stepped and repeated, e.g., 26, 28, and/or 30. For instance, a first design element 22*a* seen in FIG. 2 can be stepped or repeated 26 within a region 24, such as in relation to X-axis 34*x* and/or Y-axis 34*y*. Similarly, a second design element 22*b* seen in FIG. 2 can be stepped or repeated 26 within a region 24, such as in relation to X-axis 34*x* and/or Y-axis 34*y*, and one or more regions 24 can also be stepped and/or repeated 28, 30. Similarly, the design elements 22 and/or regions 24 can be scaled and/or rotated at different positions in a design.

A Workflow for an Embodiment of the Invention

Fabric Design Creation

Figure 3:
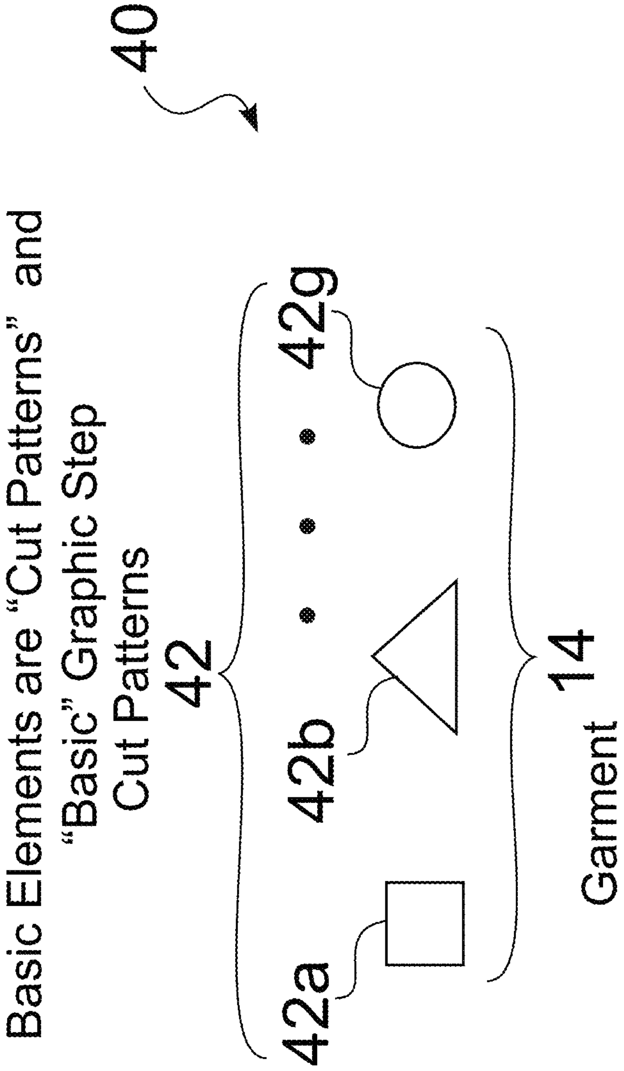
FIG. 3 is a simplified view of basic cut patterns that can be associated with one or more graphic elements.

FIG. 3 is a simplified view 40 of basic elements or cut patterns 42, e.g., 42*a*-42*g*, that can be associated with one or more graphic elements 22. One or more design or cut patterns 42 can be defined 402 (FIG. 9) using graphic design tools, such as Adobe Photoshop or Adobe Illustrator. A basic design pattern 42, which can be repeated on the fabric 302 (FIG. 8) to create a continuous design, is defined. Colorways are defined as well. As will be described below, the printing 407 (FIG. 9) is deferred to a later stage.

Figure 4:
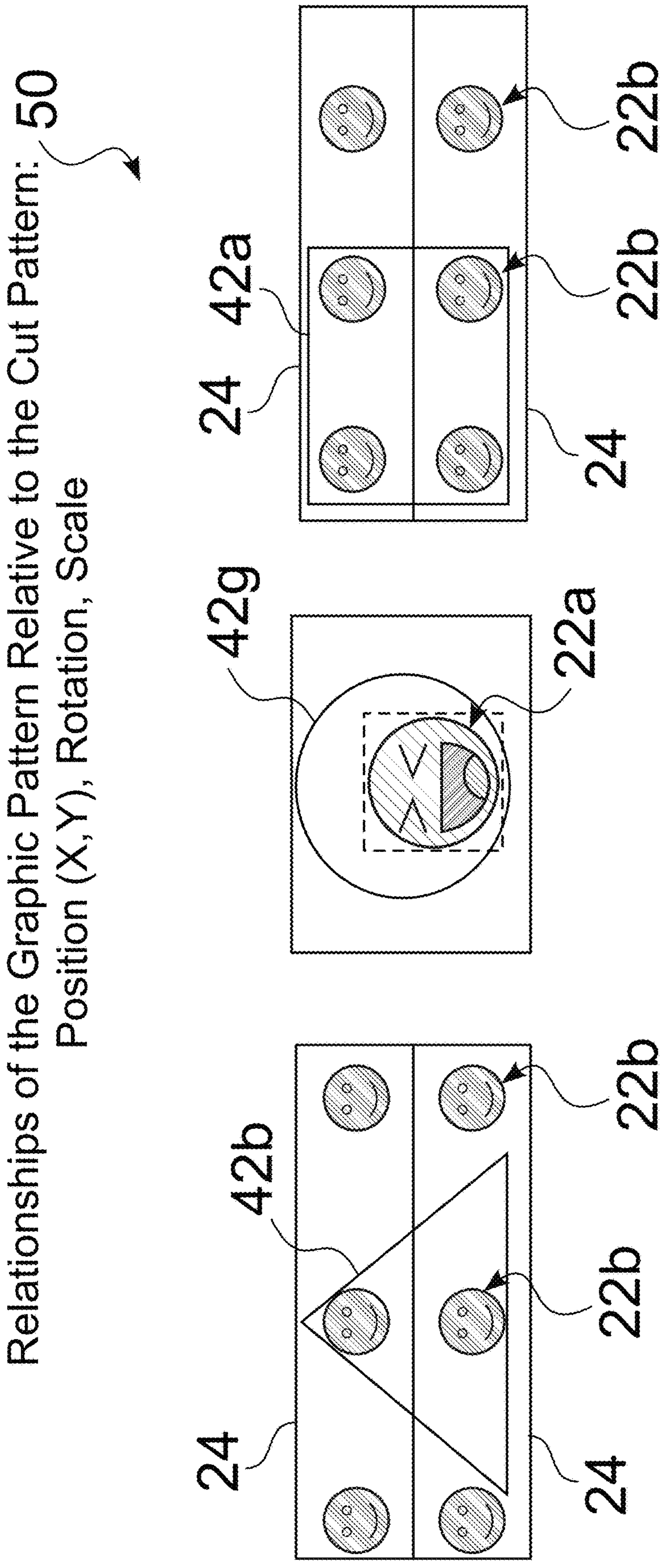
FIG. 4 shows illustrative associations of different cut patterns with graphic designs.

FIG. 4 shows illustrative associations 50 of different cut patterns 42 with graphic designs 22. For instance, a cut pattern 42*b* seen in FIG. 4 is positioned, e.g., with respect to (X,Y), with respect to neighboring regions 24, and includes two graphic elements 22*b*. Similarly, a cut pattern 42*a* seen in FIG. 4 is positioned with respect to neighboring regions 24, and includes four graphic elements 22*b*. As also seen in FIG. 4, a cut pattern 42*b* located in a corresponding region 24 includes a single graphic element 22*a*.

Garment Creation

A design of the garment 14 can created 404 (FIG. 9) using graphic design tools such as Adobe Photoshop or Adobe Illustrator. In an embodiment, the design is converted to a technical design, using 2D/3D CAD systems such as EFI-Optitex. The output of this process is a set of cut and sew patterns. The position of the design basic block/step is aligned properly to each cut pattern 42, with the correct rotation/scaling or any other geometrical transformation.

In an embodiment, the nesting, i.e. the positioning of the design or cut patterns 42, is performed as if it is for a "white" fabric, i.e. without any consideration to the design pattern, which in some embodiments can be laid out as densely as possible, to minimize fabric waste. In some embodiments, this process may be done with the Optitex CAD system.

Figure 5:
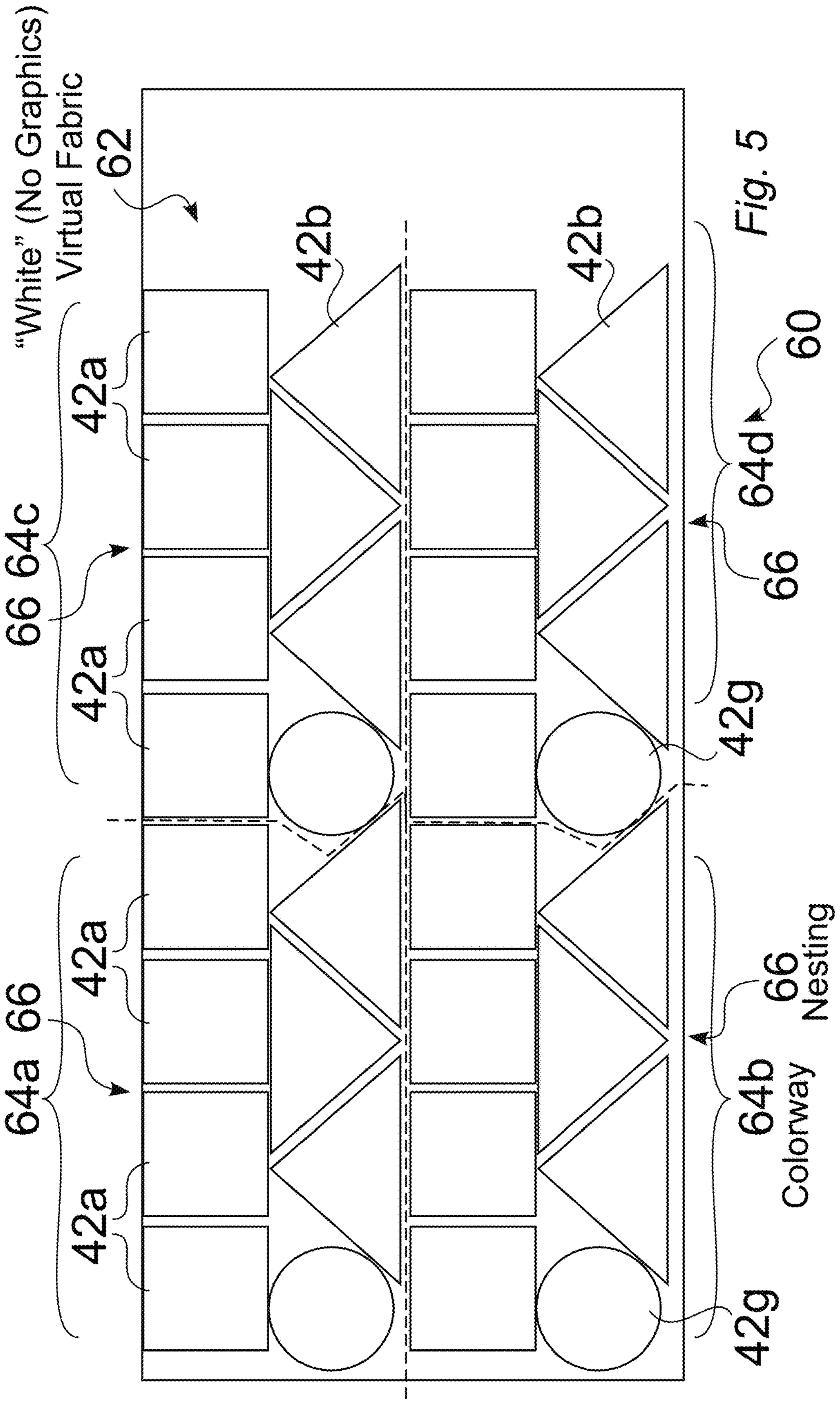
FIG. 5 shows optimized nesting on "white" (no graphics) virtual fabric, where each cut pattern carries its own relationships to the graphic pattern.

FIG. 5 is a schematic view 60 that shows optimized nesting on "white" (no graphics) virtual fabric 62, where each cut pattern 42 carries its own relationships to the graphic pattern. The illustrative schematic view 60 seen in FIG. 5 includes four groups 64, e.g., 64*a*-64*d*, of patterns 42, in which each of the illustrative groups includes four cut patterns 42*a*, three cut patterns 42*b*, and one cut pattern 42*g*. In some embodiments, the illustrative groups 64 can correspond to all of the necessary cut patterns for a garment 14. As well, in some embodiments, the illustrative groups 64 can correspond to the same or different designs. For instance, for a single design, the different groups 64 can be identical, or can be different, such as to be used for different colorways and/or different sizes.

Figure 6:
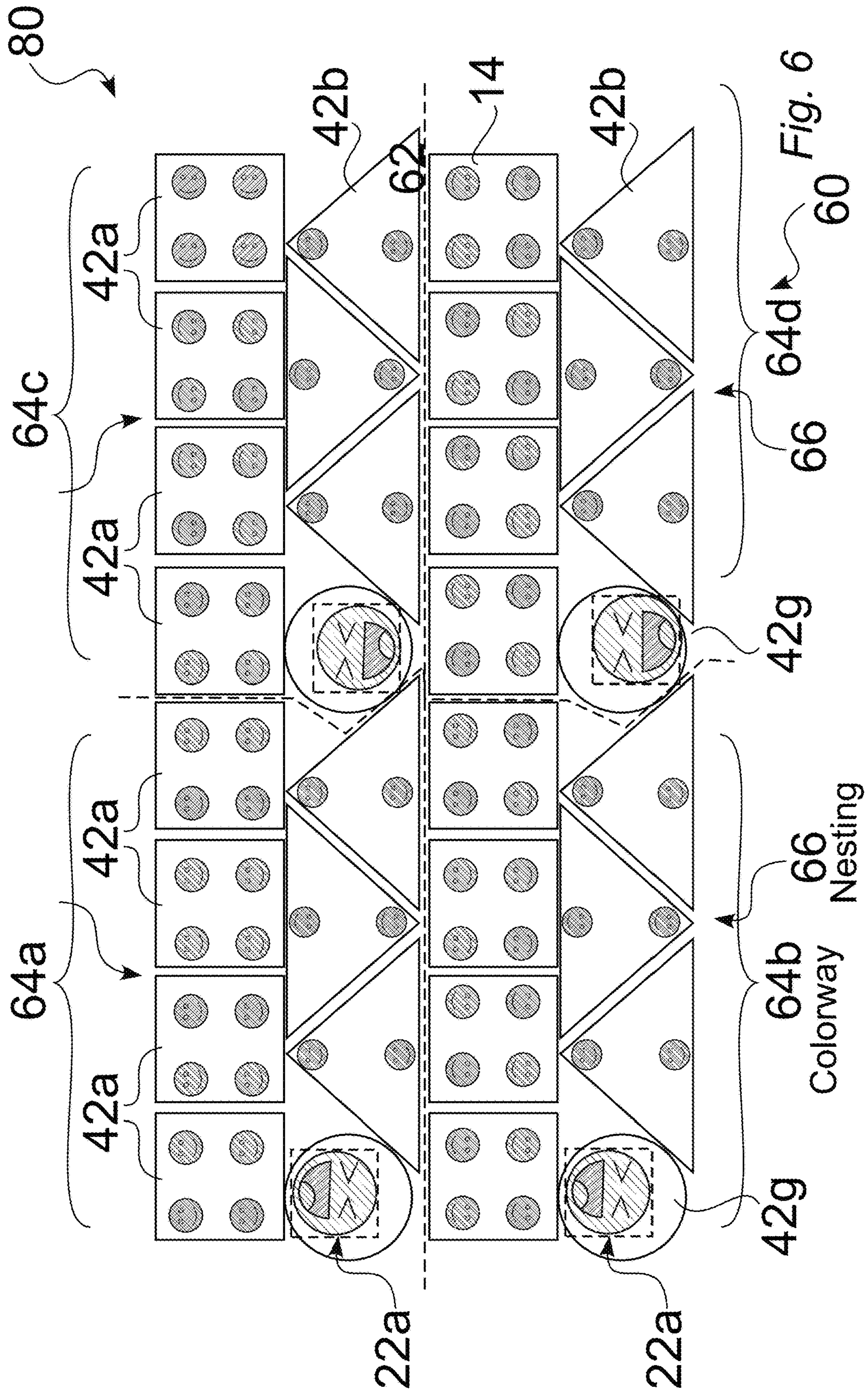
FIG. 6 shows a final cut and image layout presentation before going into print and cut.
Figure 9:
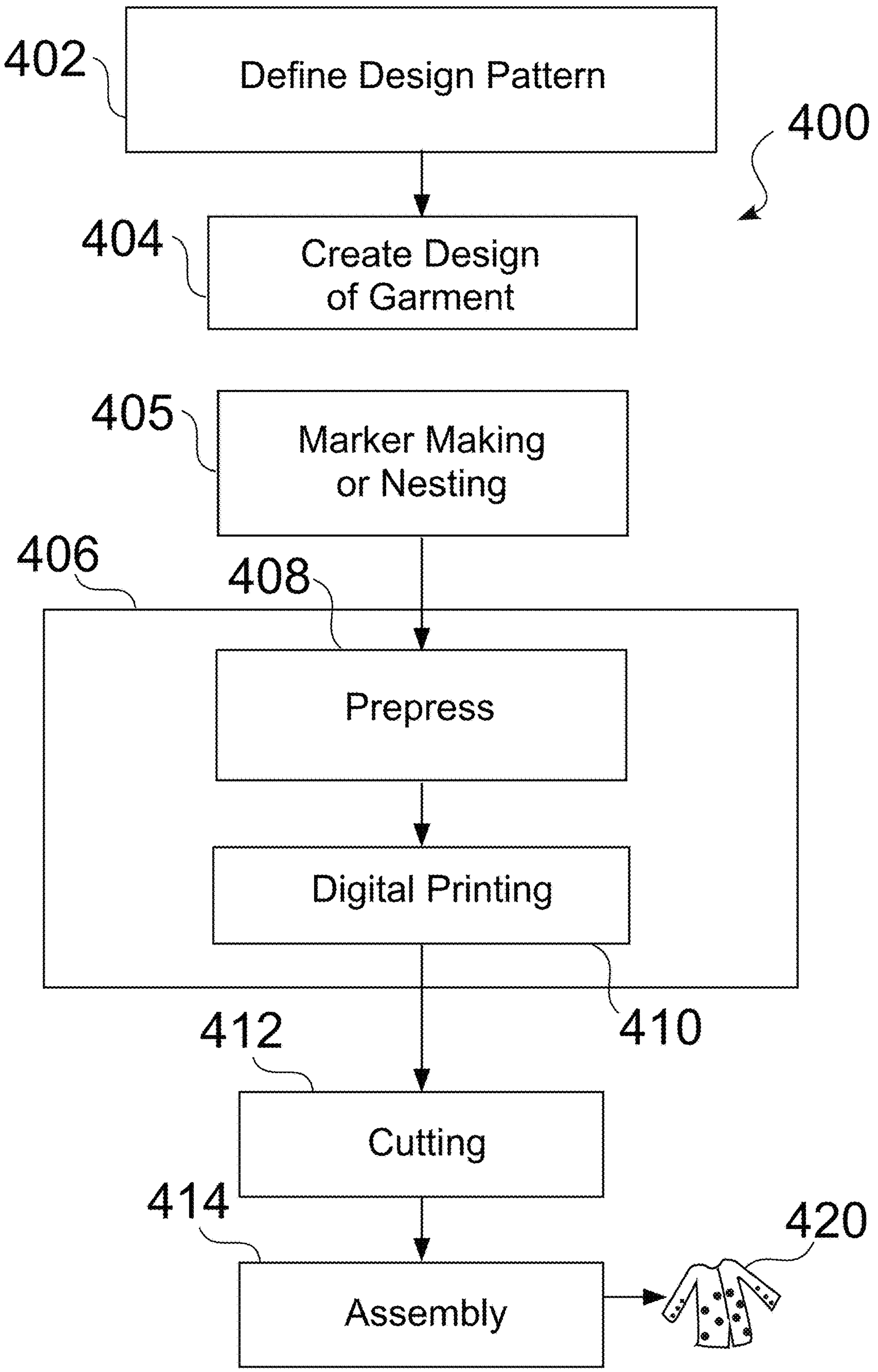
FIG. 9 is a flowchart of an illustrative process for fabric printing using nested patterns.

FIG. 6 is a schematic view 80 that shows a final cut and image layout presentation 80 before going into print 406 (FIG. 9) and cut 412 (FIG. 9). In some embodiments, the nesting layout 80, which includes the positioning of the cut patterns 42 and the association of each cut pattern to the graphic design block, e.g., 22*a*, 22*b*, can be sent to the DFE 510 (FIG. 10) as a portable document format (PDF) or postscript (PS) file. In some embodiments, the DFE 510 executes the PDF or PS file, resulting in print instruction for the digital press or printer 512 (FIG. 10) which prints 410 (FIG. 9) each cut pattern 452, with the right graphics 22, per the nesting layout 80.

Figure 7:
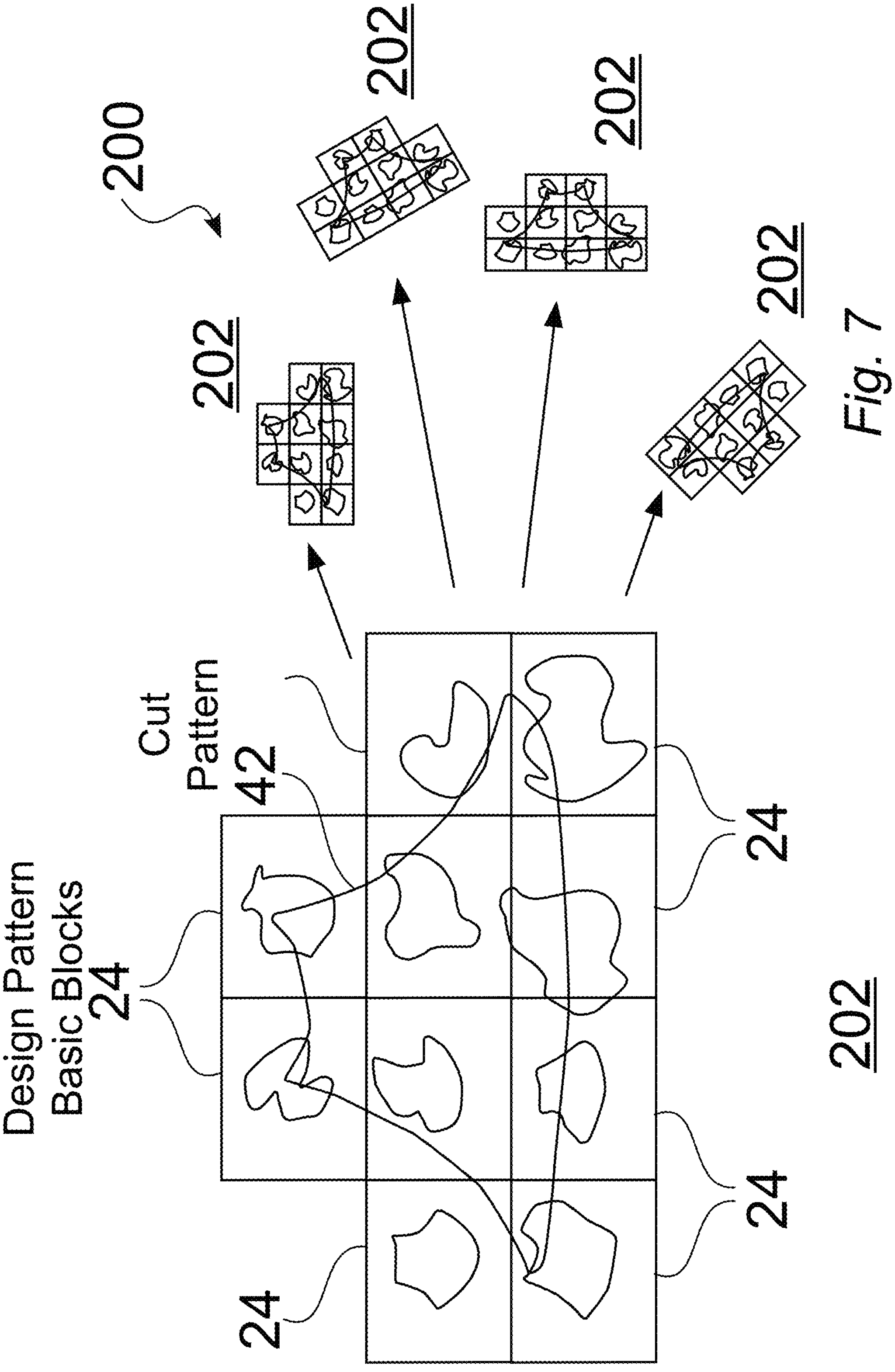
FIG. 7 shows a pattern that is nested within one or one pattern design blocks, wherein the nested blocks can then be positioned, rotated and/or scaled for a layout to be printed on a fabric.
Figure 8:
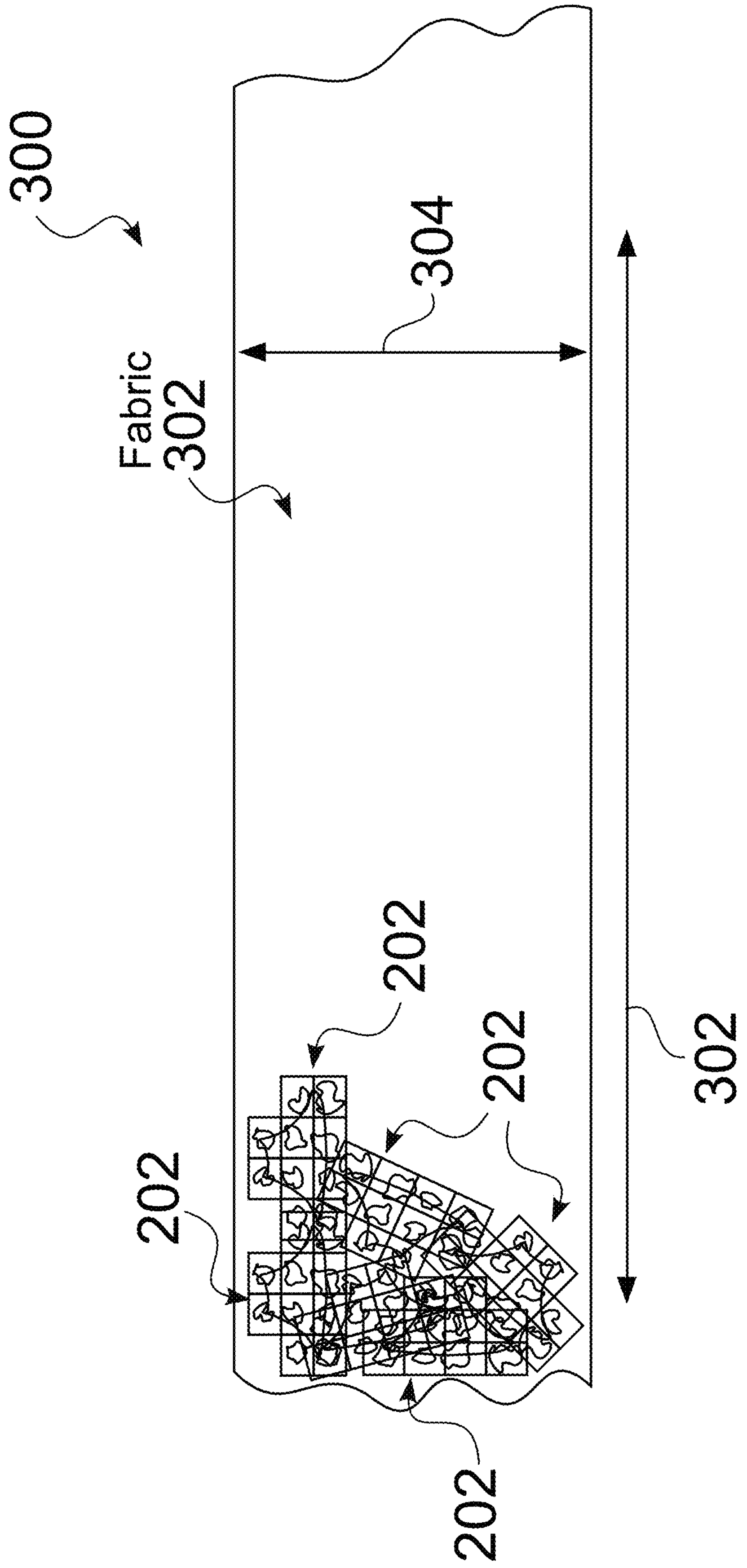
FIG. 8 shows an illustrative nesting layout on a fabric, using nested blocks.

FIG. 7 shows an illustrative cut pattern 42 that is nested within one or one pattern design blocks 24 to form a nested group 202, wherein one or more nested groups 202 can then be positioned, rotated and/or scaled for a layout to be printed on a fabric 302. FIG. 8 is an illustrative layout 300 of such nested groups 202 on a fabric 302. For each part, at any orientation needed for optimized nesting the design and cut can be aligned appropriately.

Figure 10:
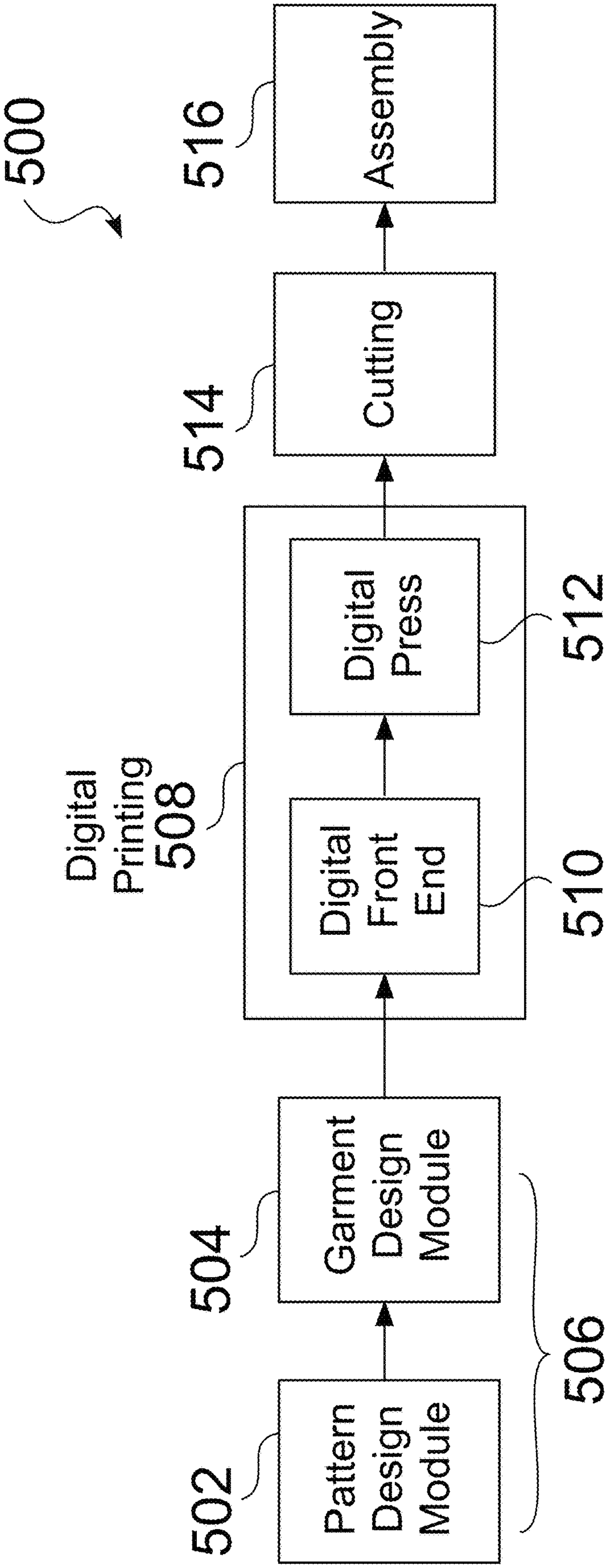
FIG. 10 is a simplified schematic diagram of a fabric printing system having nested patterns.

In some embodiments, the nesting layout 80, once defined, can be sent to the DFE/RIP/Printer 508 (FIG. 10). In a basic embodiment, the fabric structure can be ignored as a guide to nesting orientation. For example, in FIG. 8 the objects are positioned close to each other.

In FIG. 7, the illustrative rectangular design is indicated as a pattern basic block 24, while the cut pattern 42, such as shaped as a portion of a skirt, is nested in the fabric 302. For each part, at any orientation needed for optimized nesting, the design and/or cut pattern can be aligned appropriately.

Printing Using Nested Patterns

FIG. 9 is a flowchart of an illustrative process for fabric printing using optimized nested patterns. As seen in FIG. 9 the design patterns 42 for a garment 14 can be defined 402, to create of the garments parts 42 intended to be sewed together to create the final product 420. As also seen in FIG. 9, the graphic print/design 404 can be created 404, in which at least a portion of the design 404 can be performed before, after or in conjunction with the definition 402 of the cut patterns. The creation of the graphic print/design 404 typically defines the imaging and graphics/colors that appear on the garment 14. This design may be based on a repeated pattern and multiple colorways.

The illustrative process seen in FIG. 9 also includes marker making or nesting 405, in which the parts (the parts cuts design) are positioned with respect to the resulted printed fabric 302 at the right position, to reflect the designer intended objective of appearance, including the way the parts are sewn together in a way that the designs are matched together across parts 42.

The process 400 starts with a pattern design system or module 502 (FIG. 10) that outputs geometries 42 which are used as the basic elements for nesting (positioning geometric patterns in more optimized layout for minimum material usage) on the fabric 302.

In some embodiment, the pattern design system or module 503 can also create 404 the detailed print design for each geometry, in high quality, and can store the print design and output it for both nesting and for direct print. For instance, to accomplish this objective, the base print pattern is combined with the part geometry at the right place to match the other parts' geometries. The placement can be done manually via computer human interface for placing, moving, scaling, and rotating the basic print patterns 42 manually or automatically. In some embodiments, the placement is done per rules of harmonizing the appearance of design elements 22 which may flow from one geometric part 42 to one or more neighboring parts 42.

In some embodiments, the nesting 405 can use the geometries generated by the pattern design system 502, 504, and arrange them efficiently per the required volume and variety of sizes on a fabric sheet with specific dimensions, e.g., the available width 304 and length 302 of the fabric 302. In some embodiments, the digital print system 508 allows printing of any image in any shape on a gray or dyed fabric.

Once efficient arrangement is achieved, via automated nesting and/or manual manipulation of the geometric patterns, the specific print design is added and presented, such as seen in FIG. 6 and FIG. 8, as designed in the pattern design system, on each pattern geometry in the arrangement, adhering to the geometry specific orientation and location on the fabric sheer. In some embodiments, pattern geometries and/or their associated print designs can be rotated and moved around in the arrangement process.

In some embodiments, the resulting nested printed patterns geometries are sent to the digital printing system 508, such as a single big image, representing the entire arrangement. In some embodiments, the design and/or corresponding metadata can indicate the total count of the needed pieces for each color way. In some embodiments, the system can be configured to send the collection of pieces, represented as graphic files with the graphics and the shape descriptions, to the digital front end (DFE) 510 driving the digital press 512 (FIG. 10). In some embodiments, the nesting 405 is performed by the DFE 510, either as a batch process, or on the fly while printing 410.

In some embodiments, when a single composed image is sent, this image includes only the print elements 22 inside the patterns geometries 42 and not the geometries themselves 42 in their final position on the print area. In some embodiments, in which the collection of patterns to be nested by the DFE 510 is sent to the printer 508, the geometry (Clip path) is sent as well. In some embodiments, a standard cutting file is additionally generated, to be used in the cutting process, in which the cutting file includes cutting instructions and/or a marker file.

The process 400 also typically performs exact color matching calibration, raster image processing (RIP), and is directed to the final printing phase, in which an industrial printer 512 digitally prints the entire arrangement as a single big image on the textile sheet 302. In some embodiments, reference marks are printed as well, to indicate bias location of the fabric sheet 302, for later use when placing on the cutting table 514.

Following the printing 410, the fabric sheet 302 is typically placed and positioned, using the reference marks, on a standard cutting table 514 and, using the cutting file created, a standard cutting process take place, resulting with cutting 412 the fabric 302 into the design patterns 42, which already include their prints 202 as created in the print phase 410.

FIG. 10 is a simplified schematic diagram of a fabric printing system 500 having nested patterns, which can include design system 506, such as including a fabric design module 502 and a garment design module 504, which can be distinct from each other or integrated together, as desired. The printing system 500 also includes a digital printing module 508, such as including a digital front end 510 and a digital press or printer 512, which can be distinct from each other or integrated together. As further seen in FIG. 10, the output of the digital press or printer 512 can be sent directly to a cutting module or area 514, after which the output can be transported directly or indirectly to a manufacturing area 516.

Some embodiments of the system 500 combine an Optitex PDS system for pattern design 402, an Optitex Marker system for nesting 405, an EFI Fiery for color matching and RIP, i.e., prepress 408, and an EFI Textile printer 512 for direct printing 410 of the required textures on the nested patterns.

Illustrative Printing Process

In an illustrative embodiment, a PDF, PS, or other graphic language can describe the execution script, such as with the following pseudo commands describing the layout:

Graphic design basic repeat block
W,H
Graphic elements (images, text, lines, shapes . . .
Cut pattern descriptions
Cut pattern 1:
Graphic description of the shape
Description of the relationship to the graphic basic repeat
Cut pattern 2:
. . .
Bounding box of the nested repeat: X,Y, Width, Height (relative to the fabric)
Repeats: (across the width of the fabric)
Length (how many meters to prints, which represent also the repeats in the height direction
For the bounding box add:
Cut pattern1: X,Y, relative to the bounding box
Cut pattern 2 . . .
. . .

This print description language file is sent to the DFE/RIP 510 for processing and generation of the print data sent to the printing press.

Figure 11:
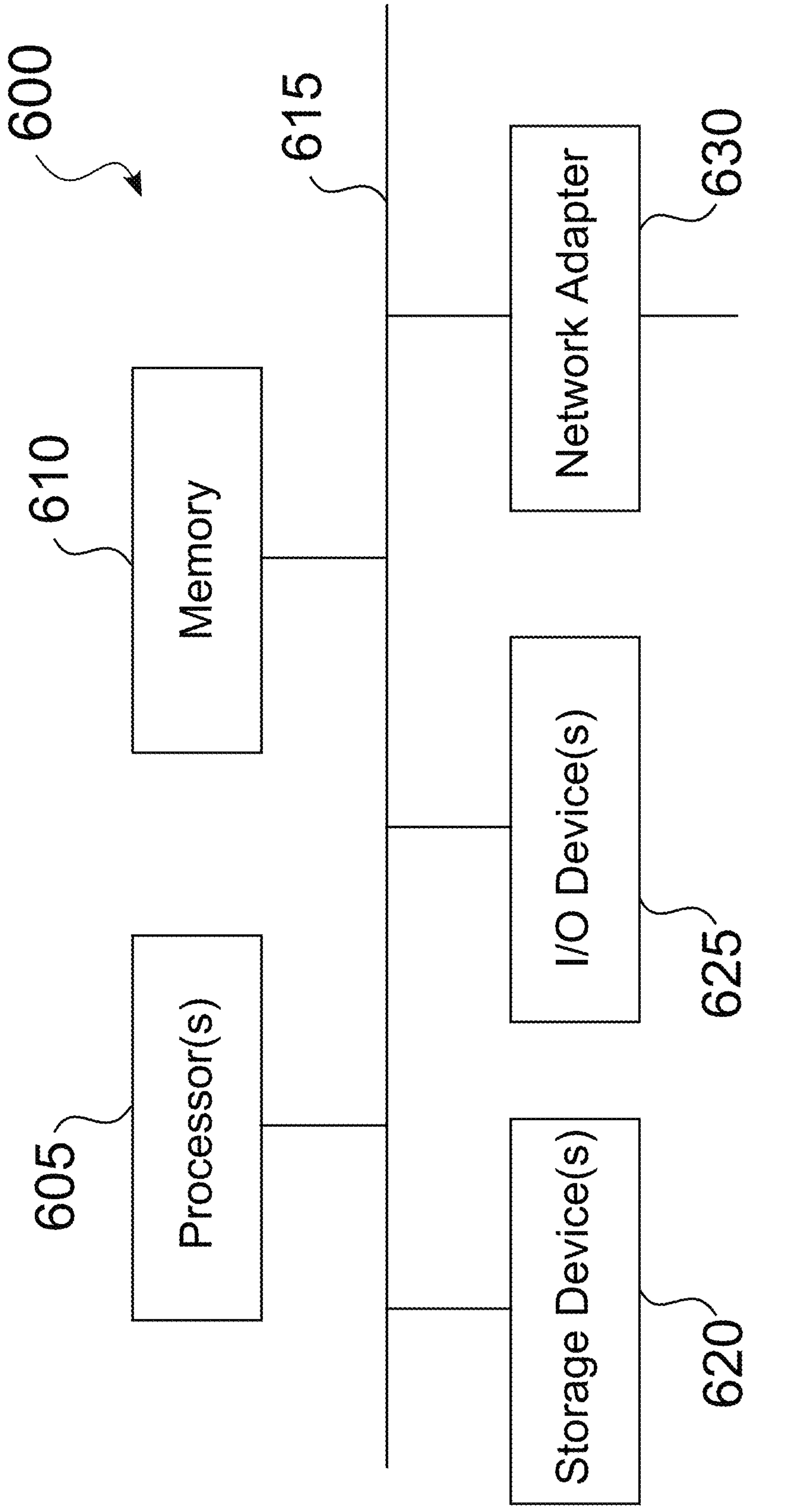
FIG. 11 is a high-level block diagram showing an example of a processing device that can represent any of the systems described herein.

FIG. 11 is a high-level block diagram showing an example of a processing device 600 that can be a part of any of the systems described above, such as for a controller or computer associated with any of the pattern design module 502, the garment design module 504, the DFE 510, the digital press or printer 512, and/or for subsequent production, such as for cutting 514 and/or assembly 516. Any of these systems may be or include two or more processing devices such as represented in FIG. 11, which may be coupled to each other via a network or multiple networks. In some embodiments, the illustrative processing device 600 seen in FIG. 11 can be embodies as a machine in the example form of a computer system within which a set of instructions for causing the machine to perform one or more of the methodologies discussed herein may be executed.

In the illustrated embodiment, the processing system 600 includes one or more processors 605, memory 610, a communication device and/or network adapter 630, and one or more storage devices 620 and/or input/output (I/O) devices 625, all coupled to each other through an interconnect 615. The interconnect 615 may be or include one or more conductive traces, buses, point-to-point connections, controllers, adapters and/or other conventional connection devices. The processor(s) 605 may be or include, for example, one or more general-purpose programmable microprocessors, microcontrollers, application specific integrated circuits (ASICs), programmable gate arrays, or the like, or a combination of such devices. The processor(s) 605 control the overall operation of the processing device 600. Memory 610 and/or 620 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 and/or 620 may store data and instructions that configure the processor(s) 605 to execute operations in accordance with the techniques described above. The communication device 630 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 625 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The printer vacuum table and printer system techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g., read-only memory (ROM); random access memory (RAM); magnetic disk storage media; optical storage media; flash memory devices; etc.

The above description and drawings are illustrative and are not to be construed as limiting. Numerous specific details are described to provide a thorough understanding of the disclosure. However, in certain instances, well-known details are not described to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

identifying, for each cut pattern of a plurality of cut patterns, a graphic design that is to be arranged within that cut pattern;

nesting the plurality of cut patterns to define positions with respect to a fabric, so as to create a nested graphic design in which (i) each cut pattern has a corresponding graphic design arranged therein, and (ii) at least some of the corresponding graphic designs are matched across different cut patterns; and causing the nested graphic design to be printed on the fabric.

2. The method of claim 1, further comprising:

defining the plurality of cut patterns, each of which corresponds to a different part of a product.

3. The method of claim 2, wherein the product is a garment.

4. The method of claim 1, wherein said causing comprises:

transmitting the graphic design to a printer that is responsible for printing the graphic design on the fabric to produce a printed fabric.

5. The method of claim 1, wherein the graphic design corresponding to each cut pattern of the plurality of cut patterns is representative of a whole or partial image, a whole or partial graphic, or a color.

6. The method of claim 1, further comprising:

generating a layout to be printed on the fabric by positioning, rotating, or scaling the plurality of cut patterns after being nested with respect to the fabric.

7. The method of claim 6, further comprising:

transmitting the layout to a printer as a portable document format (PDF) file or a postscript (PS) file that serves as instructions for printing.

8. A non-transitory medium with instructions stored thereon that, when executed by a processor, cause the processor to perform operations comprising:

identifying a graphic design to be arranged within each cut pattern of a plurality of cut patterns;

nesting the plurality of cut patterns to define positions with respect to a material, so as to create a nested graphic design in which each cut pattern of the plurality of cut patterns has a corresponding graphic design arranged therein; and causing the nested graphic design to be printed on the material, such that the material can then be cut in accordance with the plurality of cut patterns.

9. The non-transitory medium of claim 8, wherein in the nested graphic design, at least some of the corresponding graphic designs are matched across different cut patterns of the plurality of cut patterns.

10. The non-transitory medium of claim 8, wherein in the nested graphic design, at least some of the corresponding graphic designs are complementary across different cut patterns of the plurality of cut patterns.

11. The non-transitory medium of claim 8, wherein said nesting comprises:

stepping or repeating a first cut pattern of the plurality of cut patterns within a first region in relation to an X-axis or a Y-axis, and stepping or repeating a second cut pattern of the plurality of cut patterns within a second region in relation to the X-axis or the Y-axis.

12. The non-transitory medium of claim 11, wherein instances of the first cut pattern within the first region are positioned or rotated differently, so as to maintain consistency of the corresponding graphic design across the instances.

13. The non-transitory medium of claim 12, wherein instances of the second cut pattern within the second region are positioned or rotated differently, so as to maintain consistency of the corresponding graphic design across the instances.

14. The non-transitory medium of claim 8, wherein the operations further comprise:

defining, for each cut pattern of the plurality of cut patterns, a colorway that is representative of one or more colors to be included in that cut pattern;

wherein to nest the plurality of cut patterns, the colorways defined for the plurality of cut patterns are further taken into account.

15. A non-transitory medium with instructions stored thereon that, when executed by a processor, cause the processor to perform operations comprising:

arranging a plurality of cut patterns within the bounds of a plurality of blocks, such that (i) each cut pattern of the plurality of cut patterns is arranged within the bounds of a corresponding one of the plurality of blocks, and (ii) each cut pattern has a corresponding graphic design arranged therein;

generating a layout by nesting the plurality of blocks to define positions of the plurality of cut patterns with respect to a material; and providing the layout to a printer for printing of the nested plurality of cut patterns, with the corresponding graphic designs, on the material.

16. The non-transitory medium of claim 15, wherein the processor is included in the printer.

17. The non-transitory medium of claim 15, wherein said generating further comprises:

adjusting the positions of the plurality of cut patterns with respect to the material by positioning, rotating, or scaling the plurality of blocks.

18. The non-transitory medium of claim 17, wherein the layout includes multiple pluralities of blocks, each with a corresponding plurality of cut patterns arranged therein, that are nested together.

19. The non-transitory medium of claim 15, wherein the plurality of blocks are positioned adjacent each other such that the plurality of cut patterns collectively define a periphery of a part to be cut from the material.

20. The non-transitory medium of claim 15, wherein the material is fabric.

* * * * *